United States Patent Office 2,859,233
Patented Nov. 4, 1958

2,859,233

AMINOALKYL SUBSTITUTED DICYCLOPENTADIENYLIRON COMPOUNDS AND THEIR PREPARATION

Peter J. Graham, Wilmington, and Gerald M. Whitman, Hockessin, Del., assignors to E. I. du Pont de Nemours and Company, Wilmington, Del., a corporation of Delaware No Drawing. Application July 1, 1953
Serial No. 365,563

8 Claims. (Cl. 260—439)

This invention relates to a new class of organometallic iron compounds and to methods for their preparation. More particularly this invention relates to a new class of aminoalkyl derivatives of organometallic iron compounds and methods for their preparation.

Organometallic compounds, in which a metal is directly linked to one or more organic radicals directly through carbon thereof, constitute a well known class of chemical compounds. Many of these exhibit interesting properties and are of commercial significance, for example, tetraethyllead, the universally used anti-knock agent for spark ignition engines; the organomercury compounds useful as fungicides; and the organometallic derivatives of the elements of groups I and II of the periodic table useful as both reactants and catalysts in chemical syntheses. However, very little is known of the organometallic derivatives of the transition elements and indeed no stable, individual organoiron compound was known until quite recently.

The preparation of the stable compound dicyclopentadienyliron was reported by Kealy and Pauson in Nature 168, 1039 (1951), and is described and claimed by Pauson in U. S. Patent application Ser. No. 291,567, filed June 3, 1952, now U. S. Patent 2,680,765, issued June 8, 1954. Some derivatives of this interesting organometallic iron compound have also recently been reported, for instance, certain diacyl derivatives and the dicarboxylic acid [Woodward et al., J. Am. Chem. Soc. 74, 3458 (1952)]. Still other derivatives have also been prepared and form the subject of the copending applications of Weinmayr, for instance, the monoacyl derivatives, Ser. No. 352,029, filed April 29, 1953, and the monocarboxylic acid, Ser. No. 312,853, filed October 2, 1952, now U. S. Patent 2,683,157, issued July 6, 1954.

The preparative method used by Kealy and Pauson involves the reaction of a Grignard reagent of cyclopentadiene with ferric chloride under anhydrous conditions. Similarly, the same route has been used in recent reports giving the preparation of other dicyclopentadienyl compounds of the elements of group VIII, for instance, Wilkinson, J. Am. Chem. Soc. 74, 6146 (1952) for dicyclopentadienylcobalt, and the copending application of Thomas, Ser. No. 298,170, filed July 10, 1952, for dicyclopentadienylnickel, now U. S. Patent 2,680,758, issued June 8, 1954. However, cyclopentadienyl metal compounds containing substituent groups in the cyclopentadienyl nuclei which are reactive with a Grignard reagent, for example, those having active hydrogens, such as amino, cannot be prepared by such a process.

It is an object of this invention to provide a new class of organometallic iron compounds and methods for their preparation. A further object is to provide new aminoalkyl derivatives of organometallic iron compounds. A still further object is to provide a new class of nuclear substituted dicyclopentadienyliron compounds and methods for their preparation. Other objects will appear hereinafter.

These objects are accomplished by the following invention of a new class of organometallic iron compounds wherein there is directly bonded to iron two cyclopentadiene rings, at least one of which carries directly bonded to nuclear carbon thereof through aliphatic carbon at least one amino group. This new class of organometallic iron compounds containing aminoalkyl substituents which has now been discovered constitutes the aminoalkyl derivatives of dicyclopentadienyliron and the various nuclear substituted dicyclopentadienyliron derivatives in which at least one of the cyclopentadienyliron nuclei carries directly bonded to nuclear carbon thereof through aliphatic carbon at least one amino group, including primary, secondary, and tertiary amino groups.

This new class of compounds can be prepared in many ways, of which probably the most convenient is the reductive amination of the corresponding dicyclopentadienyliron aldehyde or ketone derivatives, that is, by the hydrogenation in the presence of ammonia or primary or secondary amines of the nuclear carboxaldehyde derivatives of dicyclopentadienyliron, e. g., cyclopentadienyl(formylcyclopentadienyl)iron, bis-(formylcyclopentadienyl)iron, and the like of the copending application of Graham, Ser. No. 360,370, filed June 8, 1953, or the nuclear ketone derivatives, e. g., the monoacyl derivatives of dicyclopentadienyliron of the copending application of Weinmayr, supra, or the diacyl derivatives, e. g., of Woodward et al., supra. Woodward et al., supra, show the preparation of the diacyl derivatives by acylation of dicyclopentadienyliron with the requisite acyl halide in the presence of a Friedel-Crafts catalyst, e. g., aluminum chloride. Part A of the following example illustrates the preparation of the monoacyl derivatives by acylation of dicyclopentadienyliron with the requisite carboxylic acid anhydride. The formyl derivatives can be prepared by reacting dicyclopentadienyliron or hydrocarbon substituted dicyclopentadienyliron compounds with equimolar proportions of phosphorus oxychloride and N-methylformanilide to form the monoformyl derivatives and in higher molar proportions of the phosphorus oxychloride and the N-methylformanilide to form the bis-formyl derivatives—see Method 142, page 281, Wagner-Zook, "Synthetic Organic Chemistry," Wiley, 1953—as disclosed in the copending application of Graham, Serial No. 360,370, filed June 8, 1953.

The following example in which the parts given are by weight is submitted to illustrate further but not to limit this invention.

EXAMPLE

*Part A.—Preparation of acetylcyclopentadienyl-(cyclopentadienyl)iron*

A mixture of 33.3 parts of dicyclopentadienyliron and about 225 parts of acetic anhydride was heated to 65° C. and about 18 parts of 85% phosphoric acid then added. An immediate reaction occurred and the reaction mixture was maintained at 90° C. for 10 minutes, cooled slightly, then poured directly onto crushed ice. After standing overnight, the resultant aqueous mixture was neutralized by the addition of solid sodium carbonate, the neutral mixture was cooled, and the solid product was removed by filtration. After water washing and drying, the crude acetylcyclopentadienyl(cyclopentadienyl)iron was obtained as a tan powder. After sublimation at a pressure corresponding to 1 mm. of mercury at 80° C. and subsequent recrystallization of the sublimed product in n-heptane, there was finally obtained 28.4 parts (70% yield of pure acetylcyclopentadienyl(cyclopentadienyl)iron as orange crystals melting at 83–84° C.

*Analysis.*—Calc'd for $C_{12}H_{12}FeO$: C, 63.17%; H, 5.30%; Fe, 24.48%. Found: C, 63.02%; H, 5.32%; Fe, 24.88%.

Part B.—Preparation of 1-aminoethylcyclopentadienyl-(cyclopentadienyl)iron

A mixture of 22.8 parts of the above acetylcyclopentadienyl(cyclopentadienyl)iron, 30 parts of liquid ammonia, 10 parts of alloy skeleton nickel hydrogenation catalyst, and about 100 parts of absolute ethanol was heated in a pressure-resistant reaction vessel for three hours at 100° C. under a pressure of 2000 lb./sq. in. hydrogen. The reaction vessel was then cooled, vented to the atmosphere, and the red-orange reaction mixture removed. About two parts of a diatomaceous silica filtering aid was added and the mixture then filtered to remove the catalyst. The clear filtrate was poured into 500 parts of cold water and the product extracted from the resultant aqueous mixture with diethyl ether (about 420 parts). The ether extracts were washed three times with water and then dried for 20 hours at room temperature with anhydrous magnesium sulfate. The drying agent was then removed by filtration and the clear filtrate diluted with about 700 parts of anhydrous diethyl ether. Dry hydrogen chloride was then passed into the ether solution until no further solid formed. The solid hydrochloride was removed by filtration, washed with anhydrous diethyl ether, and dried. The resulting pink hydrochloride salt was slurried with about 150 parts of chloroform, the solid removed by filtration, and finally washed with excess chloroform. After drying, there was thus obtained 5.9 parts of the partially purified hydrochloride as a pale yellow solid. After recrystallization from about 50 parts of anhydrous ethyl alcohol, there was obtained 3.3 parts of pure 1-aminoethylcyclopentadienyl(cyclopentadienyl)-iron hydrochloride as lemon yellow crystals, melting at 163–164° C. with decomposition.

*Analysis.*—Calc'd for $C_{12}H_{16}ClFeN$: C, 54.25%; H, 6.07%; N, 5.27%. Found: C, 54.49%, 54.44%; H, 6.33%, 6.19%; N, 5.37%, 5.38%.

The free base, i. e., 1-aminoethylcyclopentadienyl(cyclopentadienyl)iron, as is generically true of all the amine acid addition salts of the new aminoalkyldicyclopentadienylirons of this invention, can be easily obtained by conventional means. For instance, to an aqueous, carbon dioxide (carbonate) free solution of the above 1-aminoethylcyclopentadienyl(cyclopentadienyl)iron hydrochloride is added rapidly with stirring at room temperature a carbon dioxide (carbonate) free, aqueous solution of a strong base, preferably the strong inorganic bases, e. g., the alkali metal or alkaline earth metal hydroxides, e. g., sodium hydroxide, containing the said base in equimolar proportion based on the hydrochloride, and the resultant neutral reaction mixture is then extracted to completion with a solvent, e. g., the hydrocarbon ethers, e. g., diethyl ether, for the thus formed 1-aminoethylcyclopentadienyl-(cyclopentadienyl)iron thereby formed. Pure 1-aminoethylcyclopentadienyl(cyclopentadienyl)iron is readily obtained in pure form by conventional means, e. g., upon simple evaporation, preferably at room temperature, of the extractant solvent, diethyl ether in this specific instance. Solutions of the free bases, e. g., 1-aminoethylcyclopentadienyl(cyclopentadienyl)iron, exhibit characteristic infrared absorption peaks for NH stretching and the dicyclopentadienyliron molecular structure.

It is to be understood that the foregoing example is merely illustrative and that the invention broadly comprises aminoalkyldicyclopentadienylirons, i. e., dicyclopentadienyliron and the nuclear substituted dicyclopentadienylirons wherein at least one aminoalkyl group is attached directly to nuclear carbon of at least one of the cyclopentadiene rings, including not only primary amino but also secondary and tertiary aminoalkyl substituents. The new compounds of this invention have at least one amino group, including primary, secondary, and tertiary amino groups attached to at least one cyclopentadiene ring through at least one aliphatic carbon. The preferred compounds are solely hydrocarbon in nature, other than amino nitrogen and iron. Thus, this invention includes in its preferred aspects the mono-, di-, or polyaminoalkyl nuclear derivatives of dicyclopentadienyliron itself as well as the alkyl, aryl, cycloalkyl, aralkyl, and alkaryl nuclear hydrocarbon substituted dicyclopentadienylirons.

In schematic structural form the new aminoalkyldicyclopentadienylirons of this invention can thus be represented by the following structural formula

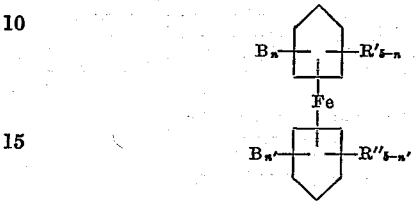

wherein $n$ and $n'$ are cardinal numerals, alike or different, and in each instance no greater than 5 with the sum of $n+n'$ being at least 1; $R'$ and $R''$ are hydrogen or solely hydrocarbon radicals, alike or different and free of aliphatic unsaturation, i. e., alkyl, aryl, cycloalkyl, aralkyl, or alkaryl radicals, and of usually no more than seven carbons apiece and preferably of no more than four carbons apiece; and B is used to represent the aminoalkyl substituents described in detail below. The $R'$, $R''$, and B groups can be on any or all five carbons of each or both of the cyclopentadiene rings provided always that there is at least one B group on at least one of the said rings. Preferably the sum of $n+n'$ does not exceed 2 and most preferably both $R'$ and $R''$ are hydrogen.

The aminoalkyl substituents directly linked through aliphatic carbon to at least one of the cyclopentadiene nuclei, i. e., $B_n$ and $B_n'$ of the foregoing, can be represented by the following structural formula:

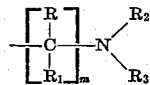

wherein the various R's as before are hydrogen or hydrocarbon radicals, free of aliphatic unsaturation and generally of no more than seven carbons each, alike or different, and $m$ is a small integer generally no greater than seven, i. e., from one to seven and preferably from one to four. The most outstanding aminoalkyl substituents, because of their greater ease of preparation, are the aminomethyl and mono- and disubstituted aminomethyl substituents of the structure

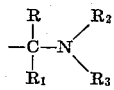

wherein the R's are as given above and especially where $R_1$ is hydrogen. Because of their greater basicity and generally higher reactivity in forming other interesting and useful dicyclopentadienyliron derivatives the primary aminoalkyl substituents and especially the primary aminomethyl, including mono-substituted methyl substituents, are preferred, i. e., aminoalkyl substituents of the formula

wherein R is as given above.

Suitable specific examples of these aminoalkyl dicyclopentadienylirons include primary, secondary, and tertiary aminoalkyl dicyclopentadienylirons wherein the only substituents are aminoalkyl substituents, e. g., aminomethylcyclopentadienyl(cyclopentadienyl)iron, bis(aminomethyl)cyclopentadienyl)iron, bis(1-aminoethylcyclopentadienyl)iron, bis(1-aminopropylcyclopentadienyl)iron, cyclopentadienyl(N-methylaminomethylcyclopentadienyl)iron, cyclopentadienyl(N,N-dibenzylaminomethylcyclopentadienyl)iron, cyclopentadienyl(1-N-phenylaminoethylcyclopentadienyl)iron, bis(1-N-cyclohexylaminoethylcyclopentadienyl)iron, cyclopentadienyl(N,N-diethylaminomethylcyclopentadienyl)iron, bis[(2-amino-tert. butyl)cyclopentadienyl]iron, i. e., bis(2-amino-1,1-dimethylethylcyclopentadienyl)iron, bis(3-amino-1,1-dimethylbutylcyclopentadienyl)iron, and the like, as well as those aminoalkyl substituted dicyclopentadienylirons wherein one or both the cyclopentadienyl nuclei carry one or more aromatic, aliphatic, araliphatic, alkaromatic, or cycloaliphatic substituents in addition to at least one aminoalkyl substituent, including specifically the primary, secondary and tertiary aminoalkyl substituents, e. g., 1-aminoethylcyclopentadienyl(ethylcyclopentadienyl)iron, N,N - dimethylaminomethylcyclopentadienyl(phenylcyclopentadienyl)iron, cyclohexylcyclopentadienyl (N - ethylaminomethylcyclopentadienyl)iron, bis(1-aminoethylbenzylcyclopentadienyl)iron, 2-amino-tert.-butylcyclopentadienyl(ethylcyclopentadienyl)iron.

Thus, this invention is generic to the aminoalkyl derivatives of dicyclopentadienyliron and the nuclear hydrocarbon substituted derivatives thereof wherein the one or more hydrocarbon substituents on either or both of the cyclopentadiene rings are free of aliphatic unsaturation and generally of no more than seven carbons each; wherein at least one of the said cyclopentadiene rings carries at least one aminoalkyl substituent, including primary, secondary and tertiary aminoalkyl substituents bonded through aliphatic carbon to nuclear carbon of at least one of the said cyclopentadiene rings; and wherein the said aminoalkyl substituents, other than amino nitrogen, are solely hydrocarbon, are free of aliphatic unsaturation, and generally contain no single hydrocarbon radical of more than seven carbons each.

The reductive amination is conventionally carried out at temperatures ranging from as low as 40° C. to as high as 150–200° C., at pressures ranging from as low as atmospheric pressure to as high as 2000–3000 atmospheres of hydrogen. Conventionally, the reaction is carried out in special pressure equipment in the higher pressure ranges, usually using a solvent for the dicyclopentadienyliron compound involved, such as, an aromatic hydrocarbon solvent or a primary aliphatic alkanol, preferably anhydrous, or the like. In those instances where primary alkylamino substituents are desired, it is generally preferable to use an excess of ammonia in order to minimize the formation of secondary aminoalkyl substituents. Thus, to illustrate, the reductive amination with ammonia of acetylcyclopentadienyl(ethylcyclopentadienyl)iron will result in the formation of 1-aminoethylcyclopentadienyl(ethylcyclopentadienyl)iron. The reductive amination of cyclopentadienyl(formylcyclopentadienyl)iron with ethylamine and hydrogen will result in the formation of cyclopentadienyl(N-ethylaminomethylcyclopentadienyl)iron. From bis(formylcyclopentadienyl)iron, bis(N-ethylaminomethylcyclopentadienyl)iron will be formed. It is to be noted that this convenient synthetic procedure results in the formation of the 1-aminomethyl and substituted aminomethyl compounds, that is, those aminoalkyldicyclopentadienylirons previously described wherein the aminoalkyl substituent has the formula

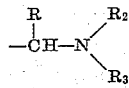

wherein the R's, which may be alike or different, are, as given before, hydrogen or hydrocarbon radicals free of aliphatic unsaturation and usually of no more than seven, and preferably no more than four, carbons each. As pointed out previously, such compounds are preferred.

Many ways are known in organic chemistry for converting various substituents to amino groups, for instance, Wagner-Zook, "Synthetic Organic Chemistry," Wiley, 1953 at chapter 24, p. 653 et seq., including, for instance, the reduction of oxime groups to amino groups (Method 426, p. 658, Wagner-Zook, supra), e. g., aldoximes to give primary aminomethyl substituents and ketoximes to give alpha-substituted primary aminomethyl substituents; the reaction of equimolar quantities of hydrazoic acid with a carboxylic acid or ketone to give primary amino substituents, i. e., the direct replacement of the carboxyl group or the ketone carbonyl with a primary amino group, i. e., the Schmidt reaction (Method 449, p. 677, Wagner-Zook, supra); the reductive alkylation or reductive amination of aldehydes and ketones (Method 431, p. 662, Wagner-Zook, supra) with ammonia, primary, or secondary amines to give, respectively, primary, secondary and tertiary aminoalkyl substituents; the aminomethylation of aldehydes, ketones, acids, and esters by the Mannich reaction with formaldehyde and ammonia or a primary or secondary amine to produce thereby respectively, primary aminomethyl, secondary aminomethyl and tertiary aminomethyl substituents of one carbon greater chain length (Method 444, p. 673, Wagner-Zook, supra); the condensation between an aromatic hydrocarbon in the presence of a polyvalent metal halide Friedel-Crafts catalyst and an alkenyl amine having at least one hydrogen on the amino nitrogen and having the alkenyl unsaturation in the beta,gamma position relative to the amine group to form an aminoalkyl hydrocarbon (see U. S. Patent 2,464,692).

Thus, to illustrate specifically, the new aminoalkyl dicyclopentadienylirons of the present invention can be prepared by the reductive amination, i. e., Method 431 of Wagner-Zook, supra, of the corresponding aldehyde and ketone derivatives, for instances, the reductive amination of ethylcyclopentadienyl(formylcyclopentadienyl)iron with dimethylamine will result in the formation of ethylcyclopentadienyl(N,N - dimethylaminomethylcyclopentadienyl)iron; the reductive amination with ammonia of acetylcyclopentadienyl(diethylcyclopentadienyl)iron will result in the formation of 1-aminoethylcyclopentadienyl(diethylcyclopentadienyl)iron; and the reductive amination with methylamine of bis(acetylphenylcyclopentadienyl)iron will result in the formation of bis[(1 - methylaminoethyl)phenylcyclopentadienyl]iron. The foregoing formyldicyclopentadienylirons including the nuclear hydrocarbon substituted formyldicyclopentadienylirons form the subject of the copending application of Graham, S. N. 360,370, filed June 8, 1953. The foregoing mono- and bis-acyl derivatives of the nuclear hydrocarbon substituted dicyclopentadienylirons, including the alkyl, aryl, cycloalkyl, aralkyl, and alkaryl hydrocarbon substituted mono- and bis-acyl derivatives of dicyclopentadienyliron can be prepared by, respectively, the methods of the copending application of Weinmayr, S. N. 352,029, filed April 29, 1953 and Woodward et al., J. Am. Chem. Soc. 74, 3458 (1952), as applied, for instance, to the aliphatic hydrocarbon substituted dicyclopentadienylirons of the copending application of Graham and Whitman, S. N. 352,294, filed April 30, 1953, or to the aromatic hydrocarbon substituted dicyclopentadienylirons of the copending application of Weinmayr, S. N. 352,283, filed April 30, 1953. In our copending application, Serial No. 352,294, filed April 30, 1953, hydrocarbon substituted dicyclopentadienylirons are prepared by reaction of a Grignard reagent of the requisite hydrocarbon substituted cyclopentadiene with ferric chloride under anhydrous conditions.

The new aminoalkyl derivatives of dicyclopentadienyliron, wherein the aminoalkyl substituent is on aliphatic carbon further removed from the cyclopentadiene rings than the one carbon, e. g., on the 2 or 3 position, can also readily be prepared by methods known in the art. For instance, as indicated above, an alkenylamine preferably with a terminal methylene group and having the amino substituent on the 2 carbon, e. g., methallylamine can be condensed with dicyclopentadienyliron or the nuclear hydrocarbon substituted dicyclopentadienylirons in the presence of a Friedel-Crafts polyvalent metal halide catalyst, e. g., aluminum chloride, in the manner of U. S. Patent 2,464,692 to form the 2-aminoalkyl substituted dicyclopentadienyliron derivattive. For instance, bis[(2-amino-tert. butyl)ethylcyclopentadienyl]iron can be prepared by condensing two molar proportions of methallylamine with bis(ethylcyclopentadienyl)iron. The new aminoalkyldicyclopentadienylirons of this invention, wherein the amino substituent is still further out in the aliphatic side chain, can be prepared by reductive amination of suitably constituted ketone derivatives of dicyclopentadienyliron. For instance, bis(3-amino-1,1-dimethylbutylcyclopentadienyl)iron can be readily prepared by the reductive amination with ammonia of bis(3-keto-1,1 - dimethylbutylcyclopentadienyl)iron—which can be obtained in the manner of U. S. Patent 2,497,673 by the condensation between two molar proportions of mesityl oxide and dicyclopentadienyliron.

Of these various methods, probably the most convenient here from the standpoint both of the availability of intermediates and ease of reaction is the reductive alkylation or reductive amination reaction, i. e., Method 431, p. 662, Wagner-Zook, supra, and "Organic Reactions," vol. 4, Wiley, 1948, the chapter by Emerson, beginning at p. 174. This procedure as illustrated specifically herein, is the method employed here and involves the simple reduction with molecular hydrogen of an aldehyde or ketone derivative of the requisite dicyclopentadienyliron structure desired in the presence of ammonia, or primary, or secondary amines, using conventional catalytic hydrogenation catalysts, such as, platinum oxide, alloy skeleton nickel, and the like. When the reducing agent is formic acid or a derivative thereof instead of molecular hydrogen, the reaction is known as the Leuckart reaction (Method 432, p. 663, Wagner-Zook, supra).

These new alkylaminodicyclopentadienyliron compounds of this invention, including the nuclear hydrocarbon substituted alkylaminodicyclopentadienyliron compounds, no matter what preparative means are used, can be isolated and purified by extraction or recrystallization from suitable unreactive liquid organic solvents, including the aliphatic and aromatic hydrocarbons, e. g., n-hexane, n-heptane, benzene, toluene, the xylenes, and the like; halogenated aliphatic and aromatic hydrocarbons, e. g., chloroform, the chlorobenzenes, and the like; the hydrocarbon ethers, e. g., diethyl ether, di-n-butyl ether, and the like. In some instances crystallization and recrystallization procedures sometimes prove less convenient and in such instances the compounds can conveniently be purified by sublimation onto a cold surface at elevated temperatures under greatly reduced pressures. Generally speaking, such sublimation purification is carried out in the range 50–150° C., usually no higher than 100° C. using conveniently a water-cooled condensation surface and operating at pressures in the range of 0.1 to 1.0 mm. of mercury. For the highest purity materials, it is usually most convenient to puriffy the aminoalkyldicyclopentadienyliron compounds by, respectively, extraction, crystallization, sublimation and finally by recrystallization.

For greater ease of handling, it is generally preferred to isolate and purify the aminoalkyldicyclopentadienyliron compounds of this invention in the form of their amine acid salts, i. e., acid addition salts through the amine group with the inorganic mono- or poly-, including di- and tribasic, simple inorganic acids, e. g., the hydrohalic acids, such as hydrogen chloride, hydrogen bromide, hydrogen iodide; the dibasic, strong oxygen sulfur-containing acids, such as sulfuric acid, the tribasic simple inorganic acids, such as phosphoric acid and the like. The preferred acid addition salts, because of greater convenience in handling the necessary acids under anhydrous conditions, are the hydrohalide salts, especially the hydrochlorides. The free aminoalkyldicyclopentadienyliron compounds of this invention can be regenerated if desired in free-base form from these acid addition salts by conventional means.

These new alkylaminodicyclopentadienyliron compounds are generically colored crystalline solids, exhibiting ultra-violet and visible spectra containing characteristic absorption peaks for amine groups and the dicyclopentadienyliron structure. These new compounds are soluble in a wide range of organic solvents and are useful in themselves as anti-knock agents, pesticides, fungicides, pharmaceutically active compounds as well as in the synthesis of other equally active compounds containing derived amino groupings such as the amide linkage and the like. In their utility as intermediates, there may be especially mentioned their use in the preparation of new and interesting condensation polyamides with dibasic carboxylic acids.

As many apparently widely different embodiments of this invention may be made without departing from the spirit and scope thereof, it is to be understood that this invention is not limited to the specific embodiments thereof except as defined in the appended claims.

We claim:

1. 1 - aminoethylcyclopentadienyl(cyclopentadienyl) iron.

2. 1 - aminoethylcyclopentadienyl(cyclopentadienyl) iron hydrochloride.

3. A compound selected from the class consisting of aminoalkyl substituted dicyclopentadienyliron compounds and their amine acid salts, wherein iron is directly bonded to nuclear carbon of two separate cyclopentadiene rings, at least one of said cyclopentadiene rings has an aminoalkyl group of 1 to 7 carbon atoms directly bonded to nuclear carbon thereof through carbon of said aminoalkyl group, the sole substituents attached to the nuclear carbon atoms of each of said cyclopentadiene rings are at most one of said aminoalkyl groups and at most one monovalent hydrocarbon radical free from aliphatic unsaturation and of not more than 7 carbon atoms, and the nuclear carbon atoms of each of said cyclopentadiene rings are otherwise bonded solely to said iron and hydrogen.

4. An aminoalkyl substituted dicyclopentadienyliron compound wherein iron is directly bonded to nuclear carbon of two separate cyclopentadiene rings, at least one of said cyclopentadiene rings has an aminoalkyl group of 1 to 7 carbon atoms directly bonded to nuclear carbon thereof through carbon of said aminoalkyl group, the sole substituents attached to the nuclear carbon atoms of each of said cyclopentadiene rings are at most one of said aminoalkyl radicals and the nuclear carbon atoms of each of said cyclopentadiene rings are otherwise bonded solely to said iron and hydrogen.

5. An aminoalkyl substituted dicyclopentadienyliron compound wherein iron is directly bonded to nuclear carbon of two separate cyclopentadiene rings, at least one of said cyclopentadiene rings has directly bonded to nuclear carbon thereof an aminoalkyl group of the formula

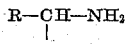

$$R-CH-NH_2$$

where R is an alkyl group of not more than 4 carbon atoms, the sole substituents attached to the nuclear carbon atoms of each of said cyclopentadiene rings are at most one of said aminoalkyl groups of the aforesaid formula, and the nuclear carbon atoms of each of said cyclopentadiene rings are otherwise bonded solely to said iron and hydrogen.

6. An aminoalkyl substituted dicyclopentadienyliron compound wherein iron is directly bonded to nuclear carbon of two separate cyclopentadiene rings, at least one of said cyclopentadiene rings has directly bonded to nuclear carbon thereof a 1-aminoethyl group, the sole substituents attached to the nuclear carbon atoms of each of said cyclopentadiene rings are at most one of said 1-aminoethyl groups, and the nuclear carbon atoms of each of said cyclopentadiene rings are otherwise bonded solely to said iron and hydrogen.

7. An aminoalkyl substituted dicyclopentadienyliron compound of the formula

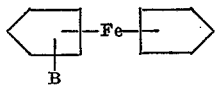

wherein B is an aminoalkyl radical of 1 to 7 carbon atoms which is directly bonded to nuclear carbon of the cyclopentadiene ring through carbon of said aminoalkyl radical.

8. An aminoalkyl substituted dicyclopentadienyliron compound of the formula

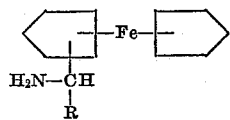

wherein R is an alkyl radical of not more than 4 carbon atoms.

References Cited in the file of this patent
UNITED STATES PATENTS

| | | |
|---|---|---|
| 2,680,756 | Pauson | June 8, 1954 |
| 2,683,157 | Weinmayr | July 6, 1954 |
| 2,694,721 | Weinmayr | Nov. 16, 1954 |

OTHER REFERENCES

Woodward et al.: J. Am. Chem. Soc., vol. 74, pages 3458–59, July 1952.

Wagner and Zook: Synthetic Organic Chemistry (1953), pages 662–663.